(12) United States Patent
Gamble

(10) Patent No.: US 11,134,091 B2
(45) Date of Patent: *Sep. 28, 2021

(54) SYSTEM AND METHOD FOR REDUCING FALSE POSITIVE SECURITY EVENTS

(71) Applicant: ROYAL BANK OF CANADA, Montreal (CA)

(72) Inventor: Jamie Gamble, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,880

(22) Filed: May 1, 2019

(65) Prior Publication Data

US 2019/0340354 A1 Nov. 7, 2019

Related U.S. Application Data

(60) Provisional application No. 62/665,208, filed on May 1, 2018, provisional application No. 62/665,198, filed on May 1, 2018.

(51) Int. Cl.
| | | |
|---|---|---|
| *H04L 29/06* | (2006.01) | |
| *G06F 16/907* | (2019.01) | |
| *G06F 16/901* | (2019.01) | |
| *G06F 21/55* | (2013.01) | |

(52) U.S. Cl.
CPC ........ *H04L 63/1416* (2013.01); *G06F 16/907* (2019.01); *G06F 16/9024* (2019.01); *G06F 21/552* (2013.01); *H04L 63/1433* (2013.01); *G06F 2221/034* (2013.01)

(58) Field of Classification Search
CPC ............ H04L 63/1416; H04L 63/1433; G06F 16/907; G06F 16/9024; G06F 21/552
See application file for complete search history.

(56) References Cited

U.S. PATENT DOCUMENTS

| | | | |
|---|---|---|---|
| 9,225,730 B1 | 12/2015 | Brezinski | |
| 9,516,053 B1 * | 12/2016 | Muddu | ................... G06N 5/04 |
| 9,537,884 B1 | 1/2017 | Raugas | |
| 9,628,506 B1 | 4/2017 | Han | |
| 10,685,284 B2 * | 6/2020 | Smyth | ..................... G06N 3/04 |
| 10,694,026 B2 * | 6/2020 | Chandrasekaran | ... H04M 3/523 |
| 10,706,144 B1 | 7/2020 | Moritz | |
| 10,805,326 B1 | 10/2020 | Wang | |
| 10,958,667 B1 | 3/2021 | Maida | |

(Continued)

OTHER PUBLICATIONS

Moustafa (Designing an online and reliable statistical anomaly detection framework for dealing with large high-speed network traffic, PhD thesis, Jun. 2017, 346 pages) (Year: 2017).*

(Continued)

*Primary Examiner* — Oleg Korsak
(74) *Attorney, Agent, or Firm* — Norton Rose Fulbright Canada LLP

(57) ABSTRACT

A cybersecurity platform that process collected data using a data model to generate security events linked to IP addresses, locations, or other variable information. The platform identifies potential false positive security events using a stability measure based on the variable information, which is then used to constrain the set of security events to reduce the effect of or remove the false positive security events from an output data structure.

15 Claims, 4 Drawing Sheets

(56) References Cited

U.S. PATENT DOCUMENTS

| | | |
|---|---|---|
| 2008/0016570 A1 | 1/2008 | Capalik |
| 2011/0083180 A1 | 4/2011 | Mashevsky |
| 2015/0013000 A1 | 1/2015 | Linnakangas |
| 2016/0301709 A1 | 10/2016 | Hassanzadeh |
| 2016/0371489 A1 | 12/2016 | Puri |
| 2017/0251013 A1* | 8/2017 | Kirti ................... H04L 63/1441 |
| 2018/0004948 A1 | 1/2018 | Martin |
| 2018/0034840 A1 | 2/2018 | Marquardt |
| 2018/0219914 A1 | 8/2018 | Reith |
| 2018/0268264 A1 | 9/2018 | Marwah |
| 2018/0316704 A1 | 11/2018 | Durairaj |
| 2018/0375893 A1 | 12/2018 | Jordan |
| 2019/0052514 A1 | 2/2019 | Fee |
| 2019/0068627 A1* | 2/2019 | Thampy .............. H04L 63/1416 |
| 2019/0098024 A1 | 3/2019 | Gaivoronski |
| 2019/0121971 A1 | 4/2019 | Fang |
| 2019/0182273 A1 | 6/2019 | Walsh |
| 2019/0215331 A1 | 7/2019 | Anakata |
| 2019/0295296 A1 | 9/2019 | Gove |
| 2019/0342307 A1* | 11/2019 | Gamble .............. H04L 63/1416 |

OTHER PUBLICATIONS

Berger et al, (Assessing the Real-World Dynamics of DNS, TMA 2012, LNCS 7189, pp. 1-14, 2012) (Year: 2012).*
Office Action dated Nov. 6, 2020 issued in U.S. Appl. No. 16/401,052.
Office Action dated Mar. 31, 2021 issued in U.S. Appl. No. 16/401,052.

* cited by examiner

SYSTEM AND METHOD FOR REDUCING FALSE POSITIVE SECURITY EVENTS

CROSS REFERENCE TO RELATED APPLICATIONS

This application is a non-provisional of, and claims all benefit, including priority to, U.S. Application No. 62/665,198, entitled SYSTEM AND METHOD FOR MONITORING SECURITY ATTACK CHAINS, dated 1 May 2018; and U.S. Application No. 62/665,208, entitled SYSTEM AND METHOD FOR REDUCING FALSE POSITIVE SECURITY EVENTS, dated 1 May 2018, the contents of these documents incorporated herein by reference in their entirety.

FIELD

The present disclosure generally relates to the field of cybersecurity and risk management, and more particularly, reducing a propensity of false positive determinations.

INTRODUCTION

Embodiments described herein relate to cybersecurity or IT security platforms to protect computing resources from theft, damage, disruption or other harm.

Specificity and sensitivity of security measures is an important consideration in technical design and implementation, directly impacting the effectiveness of a system as a security mechanism.

An increase in false positives leads to wasted resources or event fatigue, and it is important to ensure that actual alerts and notifications are directed to material events. For example, events or other data points that are indicated as abnormal in one or more monitoring mechanisms can lead to a large number of recorded events.

However, a small proportion of these abnormal readings (e.g., anomalies) are actually tied to actual security events, which may prove problematic when using machine learning data architectures utilizing statistical methods, reducing their overall effectiveness. Furthermore, given the large proportion of false positives, it is typically impossible for human analysts to investigate or take action in view of time and resource constraints.

SUMMARY

Systems, methods, and computer readable media are directed to mechanisms and techniques for reducing false positive security events where multiple data sets indicative of characteristics of events are received at different times or frequencies. The ability to generate the stability measure is restricted to the inclusion of a different data source upon which the anomaly detection model did not have at the time when the analysis that detected anomalies was performed.

The stability measure can then be used to remove false positives, or adjust measure related to the event which measure the severity, impact, or danger associated with the event. A stability measure is defined as a measure that captures how reliable the variable data component used to generate an abnormal event was during the time period the analysis took place.

The data sets can include various types of logs, which relate various device identifiers with abnormal readings (e.g., monitored network traffic). Machine learning models and/or artificial intelligence approaches are used identify abnormal events. Once the abnormal events are identified, the machine learning models and/or artificial intelligence approaches determine whether the abnormal events are security events or not, providing an automated cybersecurity triage mechanism.

A first received data set (e.g., from a continuous or real-time data stream) includes some information that can be processed to identify an initial set of anomalies (e.g., groupings or individual abnormal readings). However, this initial set include a large number of false positives.

A subsequent received data set (e.g., a second or tertiary data set) may be received that can be used to refine the security event processing approach, and as described herein, the subsequent received data set is used to first establish a stability measure associated with a device identifier, and then that stability measure is used to refine the initial set of anomalies generated from the first received data set to generate a constrained set of anomalies having a number of potential false positives removed.

In particular, some embodiments periodically or continuously determine a stability of a device or connection identifier (e.g., IP address, MAC address). This stability is utilized for reducing an initial set of security events, and thus constraining or reducing a size of a data structure tracking a set of security events. The constrained set is encapsulated in a data structure, which can then be used to generate alerts, invoke workflows for remediation, among others.

Stability values, as described in embodiments below, are generated automatically based on monitored technical characteristics, such as technical fingerprints/characteristics of machines or machine identity. A unique identifier can be coupled to a particular potential machine, and a number of unique machine identities can be used to establish metrics to estimate or predict whether an alert is a false alert or not.

The stability values are used in conjunction with data science model architectures for detecting cybersecurity alerts. For data science model architectures, if a variable often changes, it will reduce the accuracy of the results. If there is another data source that can correct improve the data set that was not available when the model is ran, approaches described herein in relation to stability measures are directed to aiding a user to be able to better interpret the results. The stability values, once generated, are used to regenerate scores for a set of security events.

An advantage of the approach described in some embodiments of first running the machine learning data architecture against the first data set, and then refining it using the second data set based on connection identifier stability compared to running the machine learning data architecture only when all the data sets are available is that a reduced amount of computational resources are required. The resource intensive computation is front-loaded during the time when the first data set is available, and a lower-cost refinement process is utilized when the second data set becomes available.

As described in various embodiments, the use of the stability values may reduce the need to re-compute a model architecture when the second data set is available, reducing computation time, and enables the identification of results that have a higher probability of being false positives. Furthermore, the approach may reduce the need to initially join two different data sets prior to the first model being run, and may allows two related but different data sets to be used for the identification of anomalies which are made available at different times.

Accordingly, as described in various embodiments, a model architecture can be built using a data source that is retrieved in real or near real time, such as a streaming data source, and then correct the results with a data source that is provided at different batch intervals (e.g. end of every day).

In accordance with an aspect, there is provided a cyber-security platform comprising a processor and a memory storing machine executable instructions to configure the processor to: collect data from different data points in a network; process the collected data using a data model to detect features in the collected data and identify outlier; generate an initial set of security events using the processed data, each event having descriptive data indicating a security threat and IP address or location; for each security event of the initial set of security events, compute a stability measure for the corresponding IP address or location; reduce the initial set of security events using the stability measures to reduce false positives and generate a reduced set of security events; and generate and transmit security alerts using the reduced set of security events.

In some embodiments, the processor is configured to compute the stability measure by using an external data source that links the IP address or location to a physical machine, determining a number of different machines during a time period associated with the respective security event, computing a data measure of the number of different machines during the time period associated with the respective security event; using the data measure to compute the stability measure.

In some embodiments, the processor is configured to compute the stability measure by using an external data source that links the IP address or location to a user, determining a number of different users during a time period associated with the respective security event, computing a data measure of the number of different users during the time period associated with the respective security event; using the data measure to compute the stability measure.

In some embodiments, the processor is configured to compute the stability measure by using a machine identity using traits of the data used to generate the respective security event, determining a number of different machine identities linked to a same IP address or location during a time period associated with the respective security event.

In some embodiments, the processor is configured to generate a score for each security event in the initial set of security events, re-generate the score for each security event in the initial set of security events using the stability measure, and use the re-generated scores to reduce the initial set of security events.

In some embodiments, the data model indicates that an IP address for a machine does not change overtime.

In some embodiments, the processor is configured to generate log records for mapping IP address to machines and use the log records the compute the stability measures.

In some embodiments, the processor is configured to compute how long an IP address is mapped to a machine for use in computing the stability measures.

In accordance with an aspect, there is provided a cyber-security processing that involves: at a processor, collecting data from different data points in a network; processing the collected data using a data model to detect features in the collected data and identify outlier; generating an initial set of security events using the processed data, each event having descriptive data indicating a security threat and IP address or location; for each security event of the initial set of security events, computing a stability measure for the corresponding IP address or location; reducing the initial set of security events using the stability measures to reduce false positives and generate a reduced set of security events; and generating and transmitting security alerts using the reduced set of security events.

In some embodiments, the process involves computing the stability measure by using an external data source that links the IP address or location to a physical machine, determining a number of different machines during a time period associated with the respective security event, computing a data measure of the number of different machines during the time period associated with the respective security event; using the data measure to compute the stability measure.

In some embodiments, the process involves computing the stability measure by using an external data source that links the IP address or location to a user, determining a number of different users during a time period associated with the respective security event, computing a data measure of the number of different users during the time period associated with the respective security event; using the data measure to compute the stability measure.

In some embodiments, the process involves computing the stability measure by using a machine identity using traits of the data used to generate the respective security event, determining a number of different machine identities linked to a same IP address or location during a time period associated with the respective security event.

In some embodiments, the process involves generating a score for each security event in the initial set of security events, re-generating the score for each security event in the initial set of security events using the stability measure, and using the re-generated scores to reduce the initial set of security events.

In some embodiments, the data model indicates that an IP address for a machine does not change overtime.

In some embodiments, the process involves generating log records for mapping IP address to machines and use the log records the compute the stability measures.

In some embodiments, the process involves computing how long an IP address is mapped to a machine for use in computing the stability measures.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Figure 1:
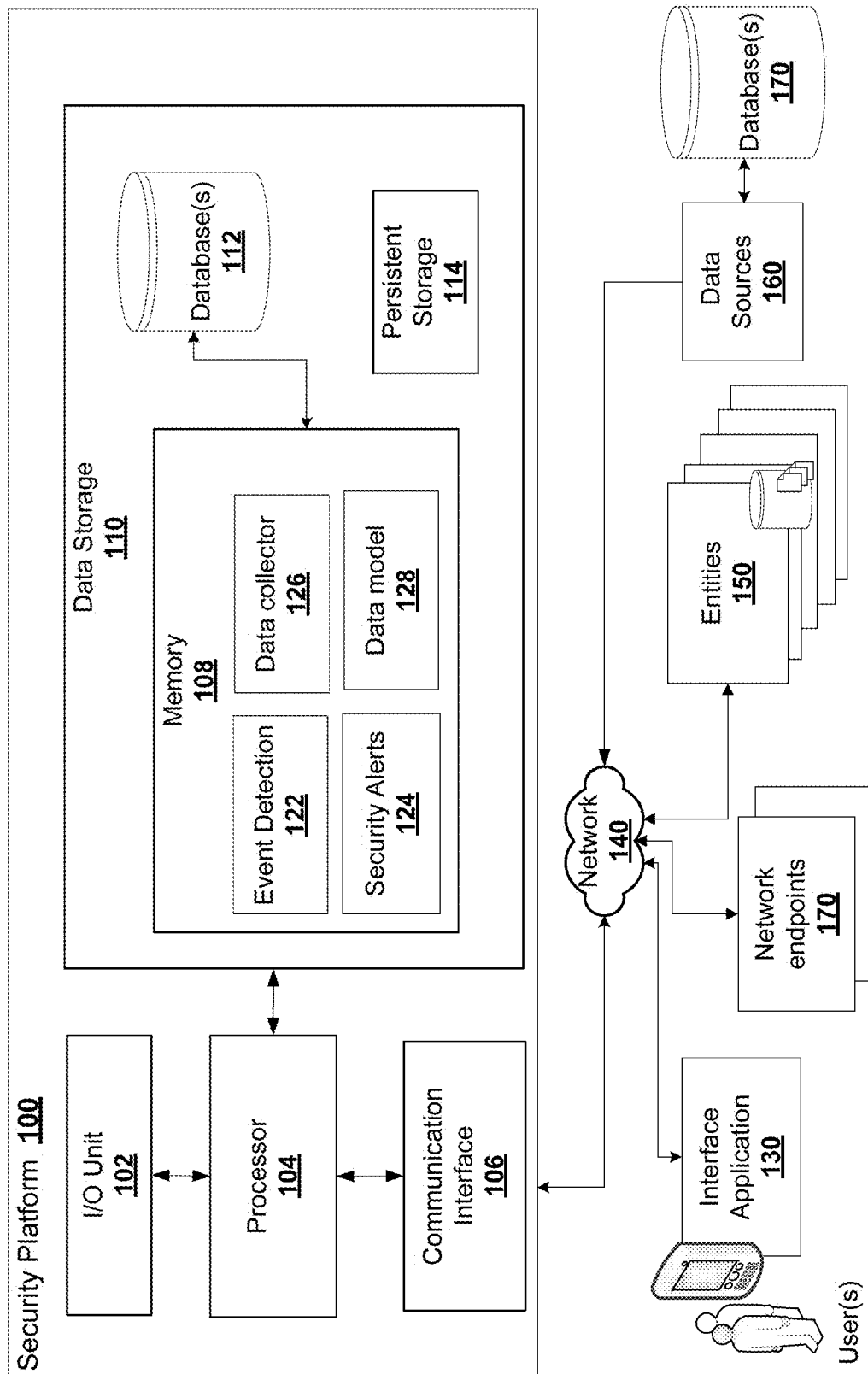
FIG. 1 is a schematic diagram of a security platform, according to some embodiments.

Embodiments of methods, systems, and apparatus are described through reference to the drawings.

Regular security simulations are conducted that mimic the actions and techniques of sophisticated hackers. During these assessments, issues were identified that were not easily detectable using traditional security tools. Two challenges were identified: the first is how to limit the number of abnormal events to those that are relevant from a security prospective; and the second challenge is how to accurately use IP addresses gathered from network log files on networks where there is not a static linking between a machine and an IP address.

For example, an analysis of web traffic could show a strange pattern originating from a single IP address. However, this IP address could have belonged to several different machines over the analyzed time period, making the anomaly meaningless.

In devising technical solutions to aid in these addressing these challenges, systems, methods, and computer readable media are directed to mechanisms and techniques for reducing false positive security events. Log data is obtained in relation to network traffic, and analysis of features in each record are performed. This data is then examined for outliers, such as events that have a deviation more than 3 standard deviations from the rest of the data. This is an approach to detect certain kinds of anomalies within network traffic.

For example, for HTTP network traffic, a network appliance may collect metadata about each request made from the company that includes how much data was sent and received, who sent it, and where it was sent to. A security analysis engine could use this to identify internal people who are sending large amounts of data outside of the network, a security event referred to as "data exfiltration". The analysis engine would be configured to do this by determining the sum of data sent in all HTTP requests between the internal and external host, and then fitting this to a statistical distribution or using another technique, such as clustering. The next step would be to use a computational statistical measure such as standard deviations to identify the outliers.

In the course of development, it was found that an assumption cannot be made in respect of the source IP address, in that the IP address is the same for every request made to external systems. This is often not the case, as most workstations on a network will be assigned IP addresses dynamically. The IP addresses for workstations will often remain the same across reboots and for a long period of time, but could quickly change if the user walks to a different building or switches from W-Fi to a wired network.

Since the source IP addresses are not reliably assigned to the same machine over time, an additional determination is proposed to determine how "stable" the source IP addresses was, which may provide an indication of how trustworthy the results from an earlier step would be. In particular, some embodiments periodically or continuously determine a stability of a device or connection identifier (e.g., IP address, MAC address). This stability is utilized for reducing an initial set of security events, and thus constraining or reducing a size of a data structure tracking a set of security events.

The constrained set is encapsulated in a data structure, which can then be used to generate alerts, invoke workflows for remediation, among others.

Stability values, as described in embodiments below, are generated automatically based on monitored technical characteristics, such as technical fingerprints/characteristics of machines or machine identity. A unique identifier can be coupled to a particular potential machine, and a number of unique machine identities can be used to establish metrics to estimate or predict whether an alert is a false alert or not.

The stability values are used in conjunction with data science model architectures for detecting cybersecurity alerts. For data science model architectures, if a variable often changes, it will reduce the accuracy of the results. If there is another data source that can correct improve the data set that was not available when the model is ran, approaches described herein in relation to stability measures are directed to aiding a user to be able to better interpret the results. The stability values, once generated, are used to regenerate scores for a set of security events.

As described in various embodiments, the use of the stability values may reduce the need to re-compute a model architecture when the second data set is available, reducing computation time, and enables the identification of results that have a higher probability of being false positives. Furthermore, the approach may reduce the need to initially join two different data sets prior to the first model being run, and may allows two related but different data sets to be used for the identification of anomalies which are made available at different times.

Accordingly, as described in various embodiments, a model architecture can be built using a data source that is retrieved in real or near real time, such as a streaming data source, and then correct the results with a data source that is provided at different batch intervals (e.g. end of every day). As described herein, model architectures are adapted that are designed to identify or otherwise address security threats by analyzing volumes of network logs, user behavior, among others.

Variations are described in embodiments of this application, including a first variant directed to tracking a source IP address of an alert and generated linkages to a physical machine or linkages to a specific user. The number of occurrences of different machines or users during the time period associated with the alert can be recorded, and a measure is established based on the number of different users/machines during the time period associated with the alert (e.g., an average # of different machines (or users) associated with the alert). A larger number indicates that it is more likely a false positive, and can be used to remove alerts or anomalies from a flagged event data structure.

In a second variant, machine fingerprints are used, and unique identifiers are established based on traits of network traffic used to generate the alert. For instance, if the alert is based upon multiple requests to web pages, a fingerprint can be derived from the HTTP headers in each request to approximate the identify a unique machine. The number of unique machine identities linked to a source IP address during the time period of an alert can then be used to create the metric used to predict if an alert is a false positive or not.

As a non-limiting, illustrative example, a portable machine may be logged into a network but wandering around floors. As the machine wanders between different access points, an identifier (e.g., IP address) continues to change. However, some machines have fairly static network connections, and consistent traffic is sent through a stable identifier, and a large proportion of this data would be accurate.

The second data set, for example, can include DHCP logs (e.g., relating IP address usages to active directory profiles, machine identifiers, MAC addresses), which can be used to establish that a particular IP address (e.g., elevator/lobby access points) are being used by a large number of different machines, and that information can be used to distinguish between the more stable IP addresses (e.g., less machines/users) and the less stable IP addresses (e.g., more machines/users). Accordingly, this can be used to correct for false positives, for example, by removing anomalies associated with the less stable IP addresses from a constrained set of events, or modifying weights or probabilities associated with the less stable IP addresses from the constrained set of events. This approach can be used, especially where the second data set is received at a different cadence from the first data set (e.g., firewall logs).

FIG. 1 is a schematic diagram of a security platform 100 according to some embodiments. The platform 100 can implement aspects of the processes described herein.

Security platform 100 connects to interface application 130, network endpoints 170, entities 150, and data sources 160 (with databases 170) using network 140. Entities 150 can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent security alerts.

The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure event detection 122, security alert unit 124, data collector 126, data models 128, and other functions described herein.

Security platform 100 can provide cybersecurity measures to identify fraud events, security events, anti-money laundering events, and so on, to trigger generation of security alerts by security alert unit 124. An example event is a simple event of user logging in at New York instead of Montreal which may be an anomaly based on past usage. The security platform 100 is configured for the reduction of false positive events (e.g. events that are flagged as potential security threats). In some embodiments, the security platform 100 is configured to use IP addresses to tie events to locations.

Locations can change over the time. For example, a mobile device can connect to a system or machine via Ethernet. The same mobile device can later connect to the system or machine via W-Fi, then walk to different room with a different IP address and connect again to the system or machine.

This may impact the ability of security platform 100 to reach conclusions regarding potential security threats as it may look like the location of the mobile device changes while it actually is in generally the same location.

Security platform 100 have a processor 104 and a memory 108 storing machine executable instructions to configure the processor 104 collect data from different data points in a network. The processor 104 can process the collected data using a data model 128 to detect features in the collected data and identify outlier. The processor 104 can generate an initial set of security events using the processed data, each event having descriptive data indicating a security threat and IP address or location. In some embodiments, the data model 128 might indicate that an IP address for a machine does not change overtime which may create bias and introduce false positives.

For each security event of the initial set of security events, the processor 104 can compute a stability measure for the corresponding IP address or location. The stability measure can be used by the processor 104 to reduce false positive security events.

The stability measure can be computed in different ways. For example, in some embodiments, the processor 104 can compute the stability measure by using an external data source that links the IP address or location to a physical machine. The processor 104 can determine a number of different machines during a time period associated with the respective security event. The processor 104 can compute a data measure of the number of different machines during the time period associated with the respective security even. The data measure can be used to compute the stability measure.

As another example, the processor 104 can compute the stability measure by using an external data source that links the IP address or location to a user. The processor 104 can determine a number of different users during a time period associated with the respective security event. The processor 104 can compute a data measure of the number of different users during the time period associated with the respective security event. The processor 104 can use the data measure to compute the stability measure. In some embodiments, the data measure is computed based on a ratio between a number of different users during the time period and a historical (e.g. mean) number of different users during the time period.

As a further example, the processor 104 can compute the stability measure by using a machine identity using traits of the data used to generate the respective security event. The processor 104 can determine a number of different machine identities linked to a same IP address or location during a time period associated with the respective security event. This can be used to compute the stability measure.

The processor 104 can reduce the initial set of security events using the stability measures to reduce false positives and generate a reduced set of security events. The processor 104 can generate and transmit security alerts using the reduced set of security events to interface application 130, for example.

In some embodiments, the processor 104 can generate a score for each security event in the initial set of security events and re-generate the score for each security event in the initial set of security events using the stability measure. The processor 104 can use the re-generated scores to reduce the initial set of security events.

The security platform 100 can assign a log file to changing IP addresses, and correlate events back to the log file. The log file can map IP addresses to physical machines or users. The log file can be stored in data storage 110. However, management of the log file by the security platform 100 may be resource intensive because of the large amount of data. In some embodiments, the processor 104 can generate log records for mapping IP address to machines and use the log records the compute the stability measures. In some embodiments, the processor 104 can compute how long an IP address is mapped to a machine for use in computing the stability measures.

In some embodiments, the security platform 100 can implement an IP address tracker that can also factor in other device data such as device fingerprints, signature, component identifiers, and so on. The IP address tracker can be used to generate machine identifiers linked to IP addresses, for example.

In some embodiments, the security platform 100 can generate and process log files and determine a stability of the location of the event. The security platform 100 can compute a confidence measure that can indicate whether the event came from a single or multiple IP addresses in a proximate location, for example, as a measure of stability. In some embodiments, the security platform 100 can generate a confidence level for the security event or alert to indicate likelihood that it represents an actual security threat.

In some embodiments, the security platform 100 can use multiple factors when evaluating a security event more trigger a security alert. The factors can include confidence level of alert or event and the stability of IP address. The security platform 100 can use the factors for the reduction of false positive events. For example, a device such as a laptop can be mobile around an office space such that it connects to different routers, different IP addresses, and so on. This may make it hard to correlate back to log file, hard to handle large volume of tracking data.

Security platform 100 can reduce false positives using rule-based data models 128. Security platform 100 can collect data from different network end point 170 and entities 150. Security platform 100 can reduce false positives to use resources more efficiently to target actual threats.

Security platform 100 can implement security simulations that mimic the actions and techniques of sophisticated hackers. During these assessments, security platform 100 can identify issue that might not be easily detectable using traditional security tools. Security platform 100 can use this data to build data models 128 that can help identify security threats by process huge data volumes of network logs, user behaviour, and other relevant information.

Security platform 100 can limit the number of abnormal events to those that are relevant from a security prospective. Security platform 100 can use data related to IP addresses gathered from network log files on networks where there might not a static linking between a machine and an IP address. For example, an analysis of web traffic might show a strange pattern originating from a single IP address. However, this IP address might belong to several different machines over the analyzed time period, making the anomaly meaningless. Security platform 100 can use data models 128 to provide context to events to better classify them and trigger more accurate security alerts using security alert unit 124.

Security platform 100 can collect data from different data points in a network 140. Security platform 100 can process the collected data using a data model 128 to identify anomalies and generate security events using event detection 122. Each event can have descriptive data indicating a security threat; correlate and store the security events in a data store, the data store storing previously generated security events.

In some embodiments, each security event indicates potential attack data, identification of users that may be implicated by the event, identification of machines that may be implicated by the event, and time data. In some embodiments, the descriptive data comprises a risk rating, a weighting or probability indicating likelihood that the security event is a false positive, the time the security event occurred, what phase of an attack lifecycle the security event potentially corresponds to, and the frequency of observed occurrences. In some embodiments, the descriptive data indicates the security threat such as a potential severity of the event, location or IP address linked to a machine relevant to the event, a probability that the event is not security related, and a reference to a stage of an attack that the event can correspond to.

Security platform 100 can implement additional processing of the security events before storing in the data store by leveraging external and internal data sources 160 linked to the events to derive location data, for example. Security platform 100 can extract additional event data not considered to represent security incidents and combine the additional data with the security events. In some embodiments, the additional event data indicates machine relationship data indicating trust between machines.

Security platform 100 can generate and transmit security alerts using security alert unit 124. Security platform 100 can limit the number of abnormal events that trigger generation of notifications by security alert unit 126 to those that are relevant from a security prospective using rules and parameters of the data model 128. Security platform 100 can minimize or avoid over optimizing the model to remove false positives as this can often result in a large number of false positives and potentially removed important alerts for (actual) threats. Security platform 100 can flag events generated by event detection 112 using big data analytic process and add more context so that security alert unit 126 flags key threats for investigation and alert generation.

Security platform 100 uses data collector 126 to collect log data from one or more devices or entities 150 that perform analysis or collection of network traffic. The data can also be collected from network endpoints 180, for example.

Security platform 100 can store the log data at data storage 110 (e.g. databases 112, persistent storage 114 or a component of memory 108) as log records. Security platform 100 can use event detection 122 to process the log records to detect features in each record and generate a set of events that may be security threats to trigger a security alert. The event data is then examined for outliers. Examples of outliers are events that have a deviation more than 3 standard deviations from the rest of the data. This is an example way to detect certain kinds of anomalies within network traffic used by many different security appliances (e.g. example network endpoints 180 or entities 150).

For example, for HTTP network traffic, a network appliance may collect metadata about each request made from a company and the metadata can include how much data was sent and received, who sent it, and where it was sent to. Security platform 100 can use this to identify internal people who are sending large amounts of data outside of the network, which is a type of security event referred to as "data exfiltration". Security platform 100 can do this by calculating the sum of data sent in all HTTP requests between the internal and external host, and then fitting this to a statistical distribution or using another technique such as clustering. Security platform 100 can use a threshold or data measure such as standard deviations to identify the outliers.

Security platform 100 can use event detection 122 to calculate a measure of stability for the source IP address. This might assume that the source IP address is the same for every request made to external systems. However, this might not be the case, as workstations on a network might be assigned IP addresses dynamically. The IP addresses for workstations might remain the same across reboots and for a long period of time, but might change if the user walks to a different building or switches from W-Fi to a wired network, for example.

As the source IP addresses might not be reliably assigned to the same machine over time, security platform 100 might perform processing based on an underlying faulty assumption. Accordingly, event detection 122 can perform an additional calculation to determine how "stable" the source IP addresses are, which will indicate how trustworthy the results (e.g. the detected events).

Security platform 100 and event detection 122 can determine how "stable" the source IP addresses are using different techniques.

An example technique can use the source IP Address of an alert or event such that event detection 122 can use an external data source that links the source IP address to a physical machine or links the network traffic to a specific user. The number of occurrences of different machines or users during the time period associated with the alert is recorded by event detection 122 using data collector 126 and stored as log records. A data measure is then computed of the number of different users/machines during the time period associated with the alert. This can be the average number of different machines (or users) associated with the event or alert, for example. A larger number might indicate that it is more likely a false positive. The event detection 122 can use the computed number to evaluate the events and eliminate some as false positives. Security alert unit 124 can then trigger alert notifications based on the remaining events. Security alert unit 124 can then trigger alert notifications for transmission to interface application 130, for example.

For example, when a workstation is assigned an IP address then log entries are normally created by the dynamic host configuration protocol (DHCP). The mappings of IP address to machine from these log entries can be recorded as log records in data storage 110 and used to create the metric (e.g. data measure) that can be used by event detection 122 to predict if the alert is a false positive.

As another example, web proxies save requests to an external website along with the user that generated the request. The mappings of IP address to user from these logs can be used to create the metric (e.g. data measure) that can be used by event detection 122 to predict if the alert is a false positive.

Another example technique is that rather than using specific links between source IP addresses and a physical machine or user, event detection 122 can use a technical fingerprint of a machine or a machine identity. A unique identifier for each machine is generated using traits of the network traffic used to generate the alert. For instance, if the alert is based upon multiple requests to web pages, a fingerprint can be derived from the HTTP headers in each request to approximate the identify a unique machine. The number of unique machine identities linked to a source IP address during the time period of an alert or event can then be used by event detection 122 to create the metric used to predict if an alert is a false positive or not.

Security platform 100 collects data from different data points in the network(s) 140. These could include network endpoints 180 (servers and workstations), network infrastructure, security appliances, entities 150, or other devices that generate data relevant to network security.

Security platform 100 models the data using data model(s) 128 and processes the data using event detection to identify anomalies or outliers based on event configurations or rules. Each model/analytic produces an event data structure that includes descriptive data indicating the potential security consequences.

The descriptive data could include the potential severity of the event, a probability that the event is not security related (or is likely a false positive), and a reference to which stage of an attack that this event could correspond to. The stages of an attack can leverage frameworks such as Lockheed Martin's Cyber Kill Chain™ and the MITRE ATT&CK™ framework, for example.

In addition to this descriptive data, each event data structure can contain details of the potential attack, including which users are potentially impacted and which machine(s) (externally and locally) are impacted, and the time the event occurred.

Security platform 100 implements additional processing of the events to generate individual alerts using configurations or rules defined by security alerts 124. The security alerts 124 can enhance the validity of the alerts by leveraging external and internal data sources 160. Security platform 100 might not discard alerts and might not over optimize the processing of alerts to remove false positives. Security platform 100 can gather and store the alerts in a central location (e.g. databases 112, storage 114) that can include previously generated alerts.

The security alert unit 124 can implement reduction of security false positive events by using an analysis of source IP randomness, for example. The statistical data models 128 can make an assumption that the IP Addresses do not change. However, this assumption might not be correct and biases the results. Accordingly, security alert unit 124 can use or generate additional factors to reduce and identify false positives by giving an indication for how valid that initial assumption is for an IP address.

The security alert unit 124 can reprioritize the alerts (e.g. security events) or rescore them with the additional information. This allows the security platform 100 to ignore some alerts or events while focusing resources on the alerts that are most accurate.

The security platform 100 is able to correlate back to log records despite the massive amounts of data by the use of an underlying assumption that IP addresses related to log events do not change and are related to the same machine. Also, the ingestion of log sources might not happen in the same time frame. For example, the data from the source used to generate the statistical data model 128 might be in real time, but the data from the logs needed for mapping IPs to physical machines might be retrieved daily. The approach used by security platform 100 does not have to wait for the additional data source to be retrieved.

The security platform 100 consumes data into the data models 128 (e.g. Hadoop environment, statistical models) and then the results are stored in a file or database 112. The data ingestion into Hadoop environment might be different for different log sources and could be in real time (streaming) or as a batch at the end of each day.

The security alert unit 124 can use a confidence measure and measure of stability (e.g. generated by event detection 122) before triggering an alert notification. The security alert unit 124 can calculate an average of different machines associated with each IP address for the same timeframe for use by the statistical data model 128. Alternative approaches would be to include a measure of how long each IP Address was associated with each machine as part of the measure.

For a comparative approach to determine how stable one IP address is relation to another IP address, the security alert unit 124 or event detection 122 can map the averages to a statistical distribution (e.g., Normal or Student-T) to see which are outliers, for example. If an outlier is associated with an alert or event, event detection 122 would be less confident that the alert from the statistical model 128 is genuine. The security alert unit 124 triggers an alert notification for the filtered or remaining events after the removal of potential false positives.

Accordingly, security platform 100 can result in a reduction of security false positive events by utilizing analysis of source IP randomness.

The data models 128 used to process the log records may involve an assumption that the IP Addresses do not change. However, this assumption is not correct and can bias the event results by event detection 122. Accordingly, event detection 122 can use additional factors to reduce or identify false positives and generate data measure as an indication for how valid that initial assumption is for an IP address linked to an event.

The event detection 122 can reprioritize the events or rescore them with the additional information. This allows event detection 122 to ignore some alerts or events while focusing resources on the events where are most accurate. This may reduce the amount of processing required by security platform and security alert unit 124 as alert notifications may be generated for a smaller set of filtered events. As noted, the ingestion of log records from data sources might not happen in the same time frame.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, a microprocessor or microcontroller, a digital signal processing (DSP) processor, an integrated circuit, a field programmable gate array (FPGA), a reconfigurable processor.

Memory 108 may include combinations of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Data storage devices 110 can include memory 108, databases 112 (e.g. graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, and so on.

The security platform 100 can provide or generate context matters for security events to attempt to avoid analyzing security events in isolation. The security platform 100 can link together security events to identify sophisticated attacks that would otherwise be dismissed as 'noise'.

An approach may include normalizing the input data so that the there is a static mapping between IP and machine, or to use an alternative data point for the analysis rather than IP address. However, this might not be practical when working with voluminous datasets in real-time. Embodiments described herein may provide a practical real-time solution for generating usable outputs from machine learning data architectures in resource and time constrained practical applications.

Figure 2:
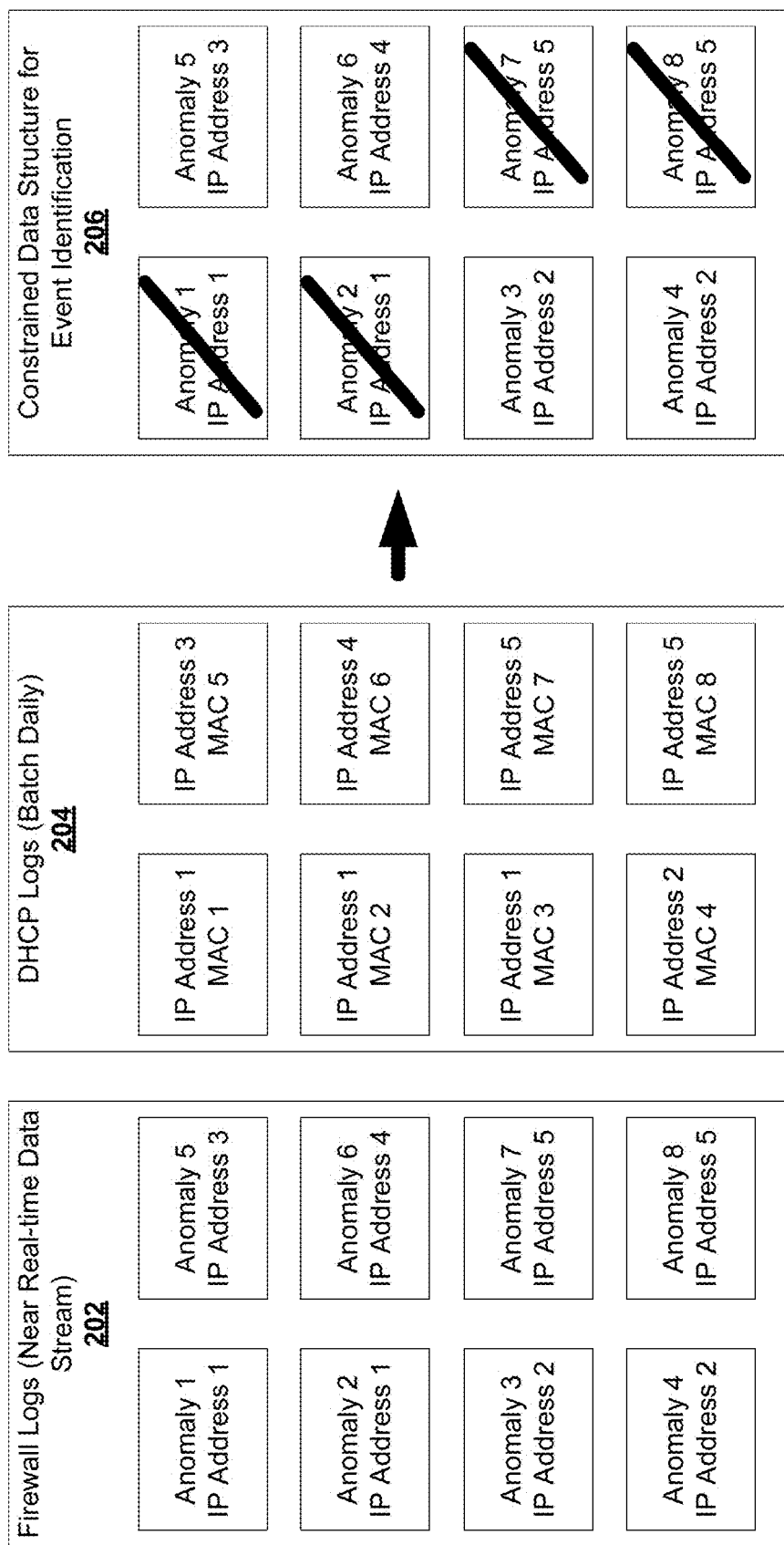
FIG. 2 is an illustration of a process for assessing identifier stability and using stability measures to reduce an overall set of anomalies, according to some embodiments.

FIG. 2 is an illustration of a process for assessing identifier stability and using stability measures to reduce an overall set of anomalies, according to some embodiments.

In this example, firewall logs 202 are shown, and are first data sets that are utilized to generate the data structure storing data element pairs representing the initial set of anomalies tied to network identifiers. However, such initial set of anomalies are rife with false positives, especially where network identifiers are often reused or recycled by machine devices (e.g., unstable). However, the firewall logs 202 are received on a continuous basis and in an accessible data stream.

The machine learning model data architectures are run to generate the initial set of anomalies tied to network identifiers, however, such output is likely unreliable. This data can be collected at different times. Generally, the data used to detect an anomaly would be available faster than the data that could be used to adjust for a variable component of the analysis.

An anomaly detection model runs on data set one to detect IP addresses that experience abnormal behaviour. The IP addresses could be associated with multiple machines, making this an unreliable data point to use, but one that is practical for this data set.

When the DHCP logs 204 are received at a different cadence, the log information may be used to establish stability measures of the underlying network identifiers (in this example, based on MAC addresses). The DHCP logs would show a mapping between the IP Address and the physical machine. This information would be useful to use in a model to reduce the reliance on the variable data point (the changing IP Addresses) however it might not be available at the same time as the proxy log data.

The output initial set of anomalies tied to network identifiers is then processed to remove or reduce probabilities or weights associated with the network identifiers identified as unstable (e.g., used by a number of underlying machine identifiers or users greater than a threshold number).

In addition to removing security events, the approach can also include changing the risk associated with the anomalies. The technique applies to security events as well as anomalies detected by data science models and rule based engines.

An output constrained data structure for event identification is established, which can then be used to generate alerts, invoke remediation workflows, or conduct quarantine/cyber countermeasures.

If the model is running on data set 1 using the IP address as a feature, it will produce inaccurate results. This could have been corrected if both data sets were combined before the model was run. However, this is not practical. Instead, this technique presents a mechanism to create a measure of the stability of the feature common to each data set that has variable values. Stability measure refers to how frequently different machines use the same IP address. A more stable IP Address will have fewer machines using it over a selected time period. The measure of stability (e.g. the IP address is known to have a number of unique machines use it) can then be used to adjust the results of the model that was just ran on the first data set.

Figure 3:
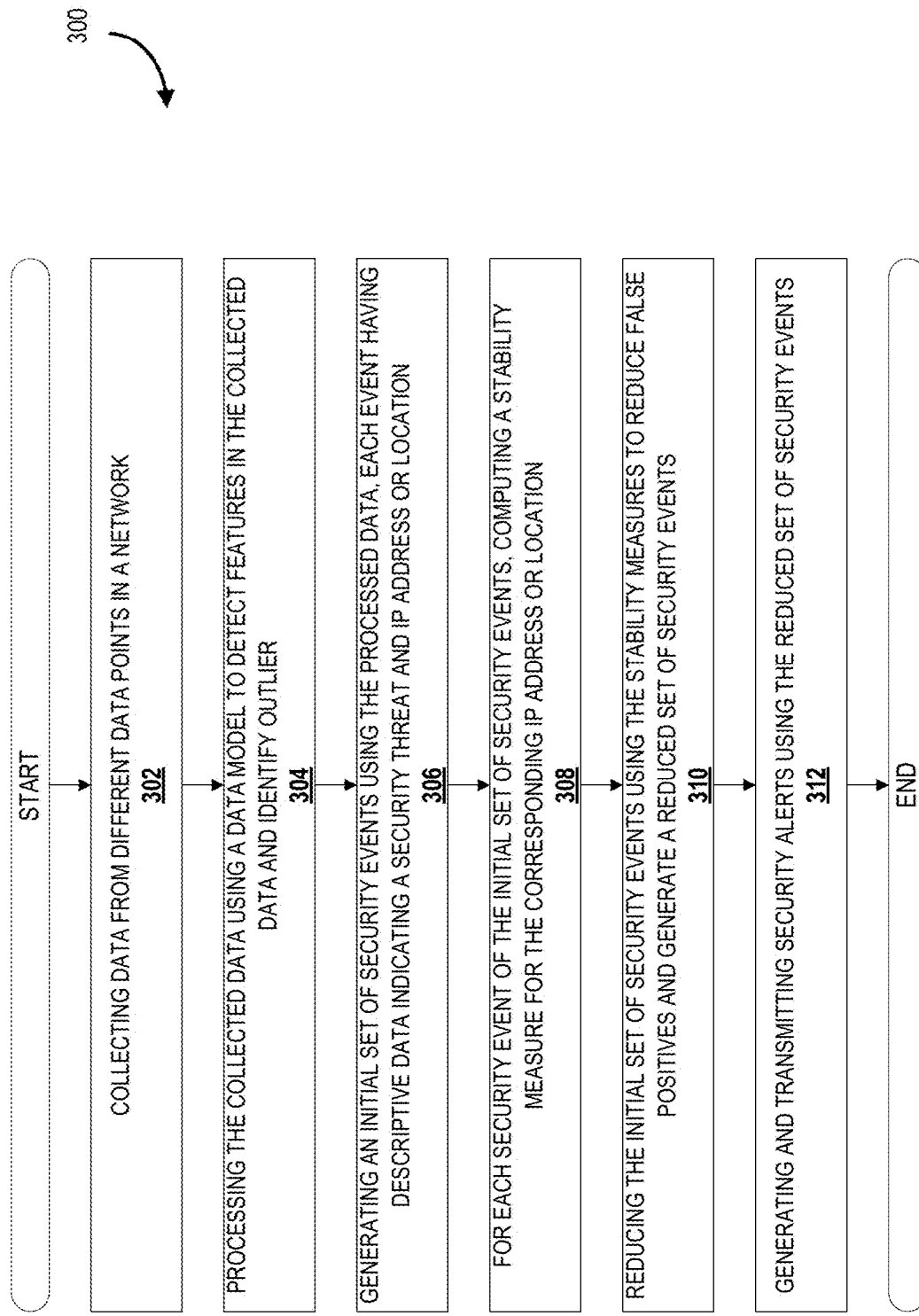
FIG. 3 is a process diagram illustrating a method for reducing false positive security events, according to some embodiments.

FIG. 3 is a process diagram illustrating a method 300 for reducing false positive security events, according to some embodiments, showing steps 302, 304, 306, 308, 310, and 312, as example steps that are executed by a computer processor to reduce false positive security events when a subsequent data is received whereby the stability of a network identifier can be established and used to constrain an initial set of identified security events or anomalies.

Figure 4:
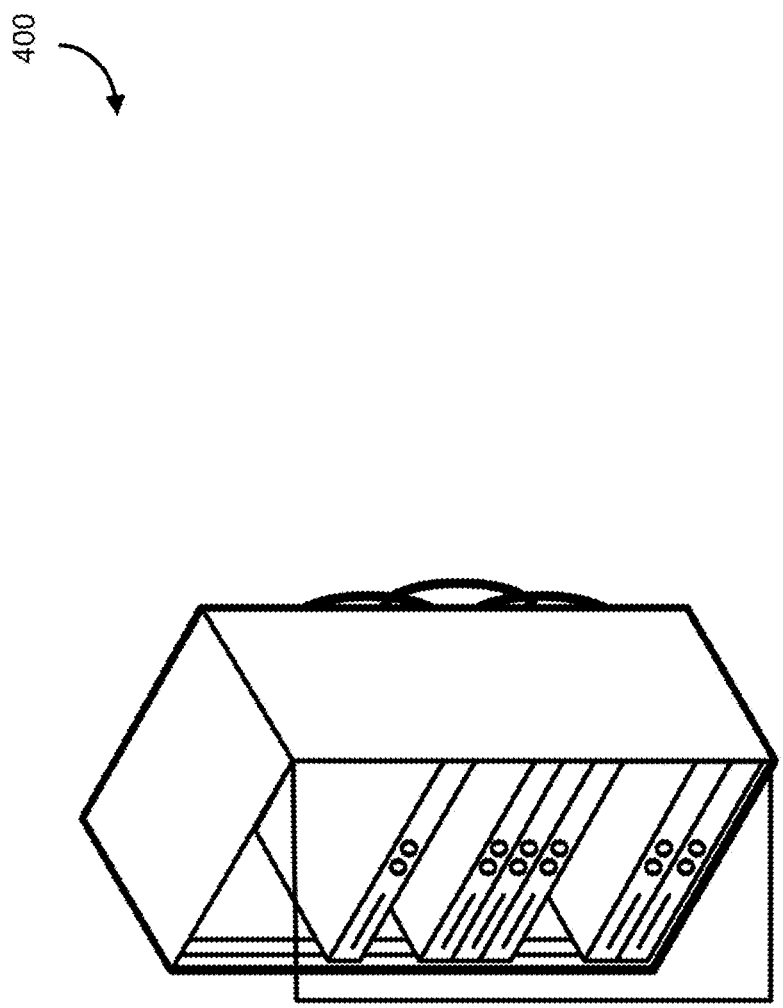
FIG. 4 is an illustration of a computer server residing within a data center, according to some embodiments.

FIG. 4 is an illustration of a computer server 400 residing within a data center, according to some embodiments. The computer server 400 includes non-transitory computer readable media, which when executed by a processor of the computer server 400, causes the processor to perform steps of methods described in embodiments herein. The computer server 400 may be a data center computing appliance, such as a rack-mounted server, which may interoperate with an enterprise messaging bus to received data sets from disparate devices, such as networked firewalls (e.g., for traffic logs), routers (e.g., for DHCP logs), or other data sources, such as data warehouses or databases.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A cybersecurity computing system comprising a processor and a memory storing machine executable instructions to configure the processor to:

collect data from different data points in a network;

process the collected data using a data model to detect features in the collected data and identify one or more outliers;

generate an initial set of security events using the processed data and the identified one or more outliers, each event having descriptive data indicating a security threat and IP address or location;

for each security event of the initial set of security events, compute a stability measure for the corresponding IP address or location;

reduce the initial set of security events using the stability measures to reduce false positives, or adjust measures that used to modify a risk level associated with events of the initial set of security events, and generate a reduced set of security events; and generate and transmit security alerts using the reduced set of security events;

wherein the processor is configured to compute the stability measure for the corresponding IP address or location by one of:
- using a first external data source that links the IP address or the location to a physical machine, determine a number of different machines during a time period associated with the respective security event, compute a data measure of the number of different machines during the time period associated with the respective security event, and use the data measure to compute the stability measure;
- using a second external data source that links the IP address or the location to a user, determine a number of different users during a time period associated with the respective security event, compute a data measure of the number of different users during the time period associated with the respective security event, and use the data measure to compute the stability measure; or
- using a machine identity using traits of the data used to generate the respective security event, determine a number of different machine identities linked to a same IP address or location during a time period associated with the respective security event.

2. The cybersecurity computing system of claim 1, wherein the stability measure is defined as a number of users who have used that IP address.

3. The cybersecurity computing system of claim 1, wherein the processor is configured to generate a score for each security event in the initial set of security events, re-generate the score for each security event in the initial set of security events using the stability measure, and use the re-generated scores to reduce the initial set of security events.

4. The cybersecurity computing system of claim 1, wherein the data model indicates that an IP address for a machine does not frequently change over time.

5. The cybersecurity computing system of claim 1, wherein the processor is configured to:
- generate log records for mapping IP addresses to machines; and
- use the log records to compute the stability measure of the IP address or the location as defined at least in part based on how often different machines use that IP address or location.

6. The cybersecurity computing system of claim 5, wherein the processor is configured to compute how long an IP address is mapped to a machine for use in computing the stability measures.

7. A method for cybersecurity processing, comprising:
at a processor,
collecting data from different data points in a network;
processing the collected data using a data model to detect features in the collected data and identify one or more outliers;
generating an initial set of security events using the processed data and the identified one or more outliers, each event having descriptive data indicating a security threat and IP address or location;
for each security event of the initial set of security events, computing a stability measure for the corresponding IP address or location;
reducing the initial set of security events using the stability measures to reduce false positives and generate a reduced set of security events; and
generating and transmitting security alerts using the reduced set of security events;

wherein computing the stability measure for the corresponding IP address or location comprises one of:
- using a first external data source that links the IP address or the location to a physical machine, determining a number of different machines during a time period associated with the respective security event, computing a data measure of the number of different machines during the time period associated with the respective security event, and using the data measure to compute the stability measure;
- using a second external data source that links the IP address or the location to a user, determining a number of different users during a time period associated with the respective security event, computing a data measure of the number of different users during the time period associated with the respective security event, and using the data measure to compute the stability measure; or
- using a machine identity using traits of the data used to generate the respective security event, determining a number of different machine identities linked to a same IP address or location during a time period associated with the respective security event.

8. The cybersecurity method of claim 7, comprising generating a score for each security event in the initial set of security events, re-generating the score for each security event in the initial set of security events using the stability measure, and using the re-generated scores to reduce the initial set of security events.

9. The cybersecurity method of claim 7, wherein the data model indicates that an IP address for a machine does not change overtime.

10. The cybersecurity method of claim 7, comprising generating log records for mapping IP addresses to machines and using the log records the compute the stability measures.

11. The cybersecurity method of claim 10, comprising computing how long an IP address is mapped to a machine for use in computing the stability measures.

12. The cybersecurity method of claim 7, comprising generating log records for mapping IP addresses to user accounts and using the log records the compute the stability measures.

13. The cybersecurity method of claim 10, wherein mapping IP addresses to machines includes mapping to MAC addresses.

14. The cybersecurity method of claim 10, wherein mapping IP addresses to machines includes mapping to computer name strings.

15. A non-transitory computer readable media, storing machine interpretable instructions which when executed by a processor, cause the processor to perform a method for cybersecurity processing, comprising:
collecting data from different data points in a network;
processing the collected data using a data model to detect features in the collected data and identify one or more outliers;
generating an initial set of security events using the processed data and the identified one or more outliers, each event having descriptive data indicating a security threat and IP address or location;
for each security event of the initial set of security events, computing a stability measure for the corresponding IP address or location;
reducing the initial set of security events using the stability measures to reduce false positives and generate a reduced set of security events; and generating and transmitting security alerts using the reduced set of security events;

wherein computing the stability measure for the corresponding IP address or location comprises one of:

using a first external data source that links the IP address or the location to a physical machine, determining a number of different machines during a time period associated with the respective security event, computing a data measure of the number of different machines during the time period associated with the respective security event, and using the data measure to compute the stability measure;

using a second external data source that links the IP address or the location to a user, determining a number of different users during a time period associated with the respective security event, computing a data measure of the number of different users during the time period associated with the respective security event, and using the data measure to compute the stability measure; or using a machine identity using traits of the data used to generate the respective security event, determining a number of different machine identities linked to a same IP address or location during a time period associated with the respective security event.

\* \* \* \* \*